United States Patent [19]
Gancy et al.

[11] 3,944,500
[45] Mar. 16, 1976

[54] PRODUCTION OF LOW BULK DENSITY PRODUCT FROM SODIUM BICARBONATE

[75] Inventors: Alan B. Gancy; Rustom P. Poncha, both of Syracuse, N.Y.

[73] Assignee: Allied Chemical Corporation, New York, N.Y.

[22] Filed: Jan. 13, 1975

[21] Appl. No.: 540,615

[52] U.S. Cl................ 252/182; 252/89 R; 423/425
[51] Int. Cl.²........................................... C09K 3/00
[58] Field of Search ............... 252/89, 182; 423/425

[56] References Cited
UNITED STATES PATENTS

| | | | |
|---|---|---|---|
| 1,473,259 | 11/1923 | Sundstrom et al.................. | 423/425 |
| 1,583,660 | 5/1926 | Cocksedge.......................... | 423/425 |
| 1,583,661 | 5/1926 | Cocksedge.......................... | 423/425 |
| 1,583,662 | 5/1926 | Sundstrom et al.................. | 423/425 |
| 3,701,737 | 10/1972 | Goldstein........................... | 252/182 |

*Primary Examiner*—William E. Schulz
*Attorney, Agent, or Firm*—Gerhard H. Fuchs

[57] ABSTRACT

Low bulk density products containing at least 10% Wegscheider's Salt ($Na_2CO_3 \cdot 3NaHCO_3$), by weight, in needlelike form are produced from sodium bicarbonate by heating in two distinct steps an aqueous feed mixture comprising by weight at least about 50% sodium bicarbonate and about 3 to 25% Wegscheider's Salt.

14 Claims, 4 Drawing Figures

PRODUCTION OF LOW BULK DENSITY PRODUCT FROM SODIUM BICARBONATE

BACKGROUND OF THE INVENTION

1. Field of the Invention

This invention relates to the conversion of sodium bicarbonate to a lower bulk density product containing at least 10% Wegscheider's Salt ($Na_2CO_3 \cdot 3NaHCO_3$), by weight. The product is a soluble, low density, mildly alkaline base which absorbs liquid wetting agent without subsequent "bleeding" onto the packaging material. This product may be used in the preparation of laundry detergents containing substantially no phosphates.

2. Description of the Prior Art

The preparation of Wegscheider's Salt by heating aqueous sodium bicarbonate at temperatures ranging from about 75° to 120°C. is known. This concept is disclosed in U.S. Pat. Nos. 1,583,660 and 1,583,662 and in British Pat. No. 202,678. British Pat. No. 202,678 discloses that a 98°C. substantially full conversion was obtained in one and one-half hours, that at 95°C. substantially full conversion was obtained in 6 hours and that at 90°C. about 50% conversion was obtained in 11 hours. Processes for heating wet sodium bicarbonate alone as described in these patents are not now commercially feasible. Product material tends to stick and cake, and a satisfactory low density product suitable for use as a detergent is not obtainable.

Dry sodium bicarbonate is known to decompose very slowly to Wegscheider's Salt. For example, dry crude sodium bicarbonate, when heated to about 120°C. for about 50 minutes, contained only about 5% Wegscheider's Salt; on the other hand, wet crude sodium bicarbonate heated to about 120°C. for about 50 minutes formed 50% Wegscheider's Salt.

Addition of sodium carbonate to aqueous sodium bicarbonate is disclosed in U.S. Pat. Nos. 1,473,259 and 1,583,662 and British Pat. No. 210,628. These patents disclose that about 30% (dry basis) sodium carbonate or about 28-29% (wet basis) sodium carbonate, by weight, is present in the feed. Such addition of sodium carbonate, per se, tends to reduce the sticking and caking problem and to increase reaction rate but does not result in products having low bulk densities, e.g. as low as about 70 grams per liter, for high Wegscheider's Salt values, i.e., in excess of 50% Wegscheider's Salt in the product.

SUMMARY OF THE INVENTION

In accordance with our invention, alkali products having low bulk densities ranging from about 70 to 400 grams per liter (about 4 to 25 pounds per cubic foot) with chemical compositions ranging from at least 10 to about 100% Wegscheider's Salt can be prepared. More particularly, we have found that products which comprise at least 10% by weight of randomly oriented Wegscheider's Salt particles in needlelike form, with the remainder of the product being sodium sesquicarbonate, sodium bicarbonate and water, can be obtained from a sodium bicarbonate feed material. The product of our invention has, in general, a bulk density ranging from about 70 to about 400 grams per liter, a water content of less than about 1% by weight and a pore volume of from about 0.10 to about 0.16 milliliters per gram (based on pores of 2 micron size and smaller).

It has also been found that, when sodium bicarbonate is mixed with an amount of water sufficient to enhance formation of Wegscheider's Salt in needlelike form and with at least about 3 to about 25% Wegscheider's Salt by weight of the mixture, and when said mixture is exposed to two-stage heat treatment, product particles having lower bulk density and greater absorptive property than the feed particles are obtained.

The process of our invention for treating sodium bicarbonate to obtain a substantially lump-free product having a lower bulk density than the feed comprises the following steps: an aqueous feed mixture comprising, by weight, at least about 50% sodium bicarbonate, about 3 to 25% Wegscheider's Salt, and about 5 to 20% water is passed to a reaction zone. The amount of water present in the feed mixture must be sufficient to enhance formation of Wegscheider's Salt in needlelike form. Preferably, the aqueous feed mixture comprises, by weight, about 50 to 80%, more preferably about 70 to 80%, sodium bicarbonate, about 15 to 25% Wegscheider's Salt and about 12 to 18% water. Thereafter, the mixture is subjected to an activation step conducted in the absence of added carbon dioxide and without a substantial weight loss under first stage heating conditions. The first stage heating conditions include a first temperature ranging between a temperature below which sodium bicarbonate is converted into nuclei of Wegscheider's Salt and a temperature above which both substantial thermal decomposition of sodium bicarbonate and substantial formation of sodium sesquicarbonate occurs for a first time sufficient to form Wegscheider's Salt nuclei while avoiding substantial caking and bulk density increase of the mixture. The temperature during the first stage heating preferably ranges from about 85° to 95°C., more preferably from about 88° to 92°C., and most preferably, said first temperature being about 90°C., as adjusted to one atmosphere. The heating of the mixture during the first stage heating preferably is carried out for about 15 to 50 minutes.

After the activation step, the mixture continues to react without the addition of carbon dioxide in a second stage heating at a temperature ranging between said first stage heating temperature and a temperature less than the decomposition temperature of Wegscheider's Salt. The second stage heating temperature is at least about 95°C. Preferably the second temperature is about 10°C. higher than the first temperature and ranges from about 10° to 20°C. above the first stage heating temperature. The temperature in the second stage heating preferably ranges between about 100° and 125°C. The mixture reacts at the second temperature for a second time sufficient to prepare a product containing at least 10% by weight of Wegscheider's Salt in needlelike form. Such second time preferably ranges from about 15 to 50 minutes.

In a preferred embodiment of this invention, the Wegscheider's Salt portion of the feed is obtained by recycling a portion of the product particles which are removed from the reaction zone.

By the process of this invention, sticking and caking in the reaction product and during the reaction are avoided and products having bulk densities as low as 70 grams per liter are obtained. In our invention a reduced amount of sodium carbonate value in the form of Wegscheider's Salt is added to the aqueous feed mixture than is known to be added in prior art processes. The reaction mixture, when maintained at the first temperature, remains free flowing; and, when subjected to the second temperature, such mixture expands rapidly to form Wegscheider's Salt. The formation of Wegscheider's Salt needles makes the reaction product absorbent and prevents sticking and caking. Without the activation (first heating) step the reaction mixture tends not to expand and tends not to become absorbent, thus causing substantial caking in the reactor.

DESCRIPTION OF THE PREFERRED EMBODIMENT

Figure 1:
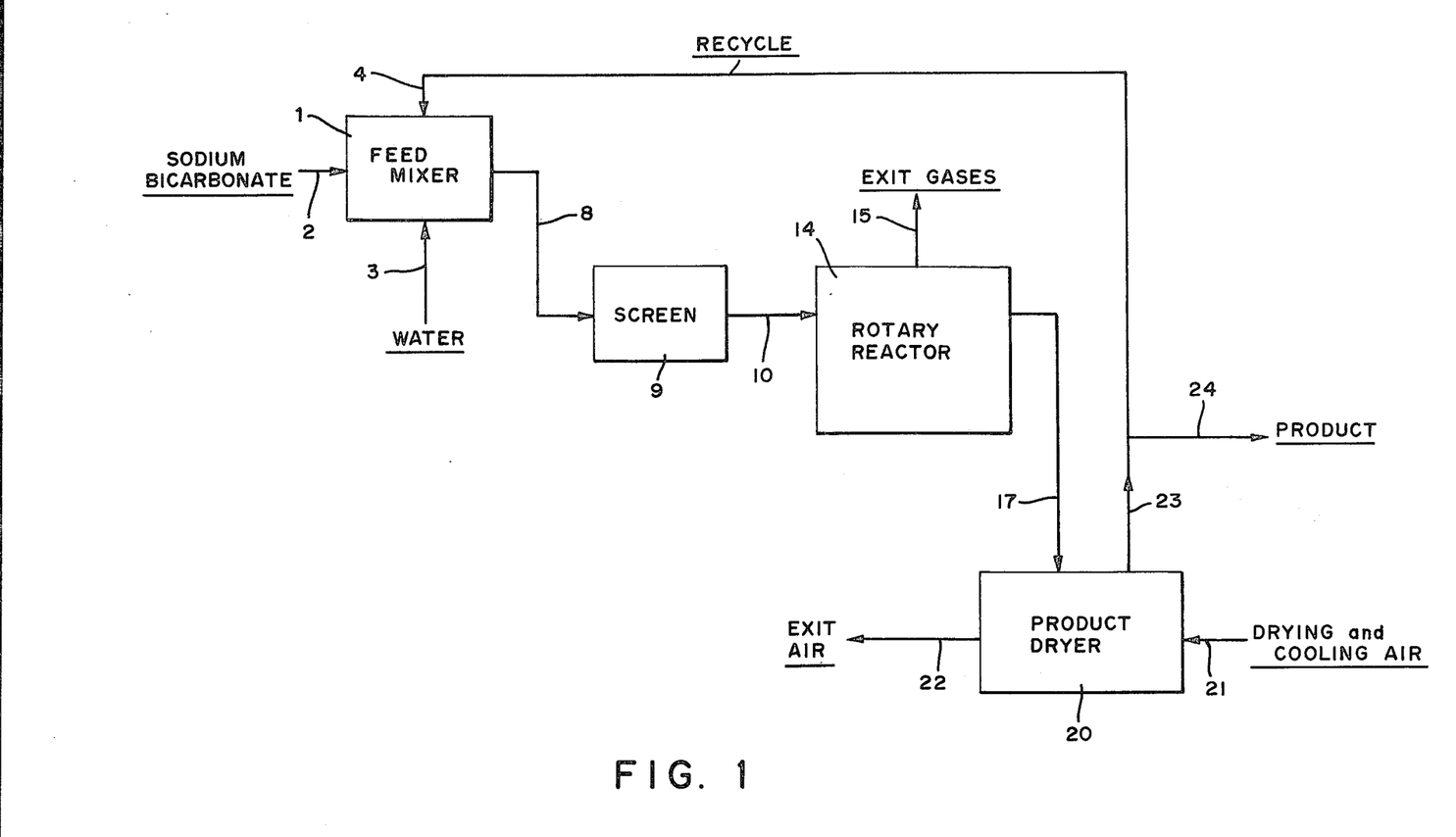
FIG. 1 is a schematic flow diagram illustrating one method of carrying out the present invention.

The accompanying drawing, FIG. 1, diagrammatically illustrates one method of carrying out the present invention. Particles of crude sodium bicarbonate enter feed mixer 1 via line 2. The crude bicarbonate, in general, has a bulk density of about 600 grams per liter. A suitable sodium bicarbonate-containing feed component which may be used in this invention is crude sodium bicarbonate prepared by the Solvay Process and having a water content of about 15%. When such crude sodium bicarbonate is used in the process of this invention, additional water does not normally need to be added to the feed mixer. For a suitable low bulk density product, the water content of the feed ranges preferably between about 12 and 18% by weight. Premature reduction of the water content in the feed leads to caking and causes the resulting product to have an undesirable high bulk density. If the water content of the wet sodium bicarbonate is less than about 5% by weight, Wegscheider's Salt may still be formed but it tends not to be in a needlelike form which enhances low bulk density. The needlelike structure of Wegscheider's Salt not only makes the product absorptive, but such structure also tends to enhance absorption of water released during the reaction so as to avoid lumping.

To this aqueous sodium bicarbonate in mixer 1 is added via line 4 an amount of Wegscheider's Salt ranging from about 3 to 25%, by weight, of the feed mixture comprising sodium bicarbonate, Wegscheider's Salt and water. The addition of Wegscheider's Salt enhances a free-flowing charge and a lump-free low-density product. Reduction of Wegscheider's Salt to values below the lower end of this range tends to yield a non-free flowing, high bulk density product which exhibits caking. When product particles containing 50 to 100% Wegscheider's Salt are desired, an amount of Wegscheider's Salt preferably ranging from about 5 to 20%, more preferably from about 15 to 25%, by weight, of the feed mixture is added to feed mixer 1. When product particles containing from about 10 to 50% Wegscheider's Salt are desired, an amount of Wegscheider's Salt ranging from about 3 to 10%, more preferably from about 4 to 8%, by weight, of the feed mixture is added to mixer 1. Preferably, Wegscheider's Salt is added to the wet sodium bicarbonate in the form of product recycle.

The components of the feed are mixed in feed mixer 1 until a uniform mixture is obtained.

Aqueous feed mixture particles from feed mixer 1 thereafter pass through line 8 into screening device 9 to break up any large lumps of feed mixture. A 12-mesh screen is normally sufficient for this purpose.

The screened aqueous mixture is then passed via line 10 into rotary reactor 14 which is rotated at a slow speed of the order of about from 30 to 40 rpm. The rotary reactor 14 is heated to maintain the temperature of the aqueous feed mixture particles at a first temperature ranging between a temperature below which sodium bicarbonate is unable to be converted into nuclei of Wegscheider's Salt and a temperature above which substantial thermal decomposition of sodium bicarbonate and substantial formation of sodium sesquicarbonate occurs. Preferably, this first stage heating (activation) step temperature ranges from about 85° to 95°C., more preferably from about 88° to 92°C. and most preferably about 90°C., as adjusted to a pressure of one atmosphere. A temperature of at least about 85°C. is needed normally to produce Wegscheider's Salt nuclei. A temperature not in excess of about 95°C. is normally employed so as to avoid thermal decomposition of sodium bicarbonate and thus formation of sodium sesquicarbonate. We have found that at a first temperature of about 70°C. or 80°C. only a partial reaction occurs; and caking and lump formation tend to be present in the product. The preferred minimum of 85°C. was derived in part from phase data for the sodium bicarbonate-water system.

The mixture is activated at this first temperature for a time sufficient to form Wegscheider's Salt nuclei and to avoid substantial caking and increase in bulk density of the mixture. Acceptable results have been found by heating the mixture for about 15 to 50 minutes. If a first time less than about 15 minutes is employed, suitable Wegscheider's Salt nuclei will not be formed from sodium bicarbonate and sodium sesquicarbonate formation will be enhanced. When product particles containing 50 to 100% Wegscheider's Salt are desired, activation conditions of heating within the range of about 85° to 95°C. for about 20 to 25 minutes have been found to be especially effective. Any increase in the first (activation) time generally has no beneficial effect, but a reduction in the time of the first heating tends to cause caking and a higher bulk density product. Furthermore, an insufficient period of activation at these temperatures appears to prevent formation of Wegscheider's Salt nuclei as well as to force the reaction to sodium sesquicarbonate formation which in turn tends to dry up the aqueous feed mixture. We have found that substantially no weight loss and substantially no expansion of the feed mixture occurs during the activation step.

After activation is completed, the mixture continues to react within rotary reactor 14 at a second stage temperature preferably ranging between 100°C. and 115°C., more preferably ranging from about 105° to 115°C. It is important that a two-stage heat zone temperature gradient is maintained in the reactor wherein the second stage heating temperature is at least about 95°C., and is preferably about 10° to 20°C. greater than the first stage heating temperature. Reaction continues at this elevated second stage temperature for a time sufficient to prepare in a relatively rapid time span product particles containing at least 10 percent by weight Wegscheider's Salt which are in needlelike form. It is also important that the second temperature remain below the decomposition temperature of Wegscheider's Salt, i.e. approximately 125°C. at atmospheric pressure. The time for heating at the more elevated second temperature is preferably at least about 15 minutes and more preferably ranges from about 15 to 50 minutes. Product particles exhibiting excellent low bulk density and high absorption characteristics have been obtained when the second time ranges from about 15 to 25 minutes.

A gas exit line 15 is provided in rotary reactor 14 to vent gases formed within the rotary reactor 14 during either the activation or the reaction steps. Exit gases may be vented to the atmosphere or to a gas recovery unit (not shown).

The product particles are discharged from reactor 14 through line 17 into a conventional product dryer 20. Drying and cooling air is introduced into cooler 20 through line 21. Separated air is released through line 22 to the atmosphere. Dried product is passed through line 23. A portion of this product is preferably recycled to the feed mixture through line 4. The remaining product passes through line 24 for further processing. The product is especially useful as an ingredient in laundry detergent which desirably has substantially no phosphate content.

Figure 2:
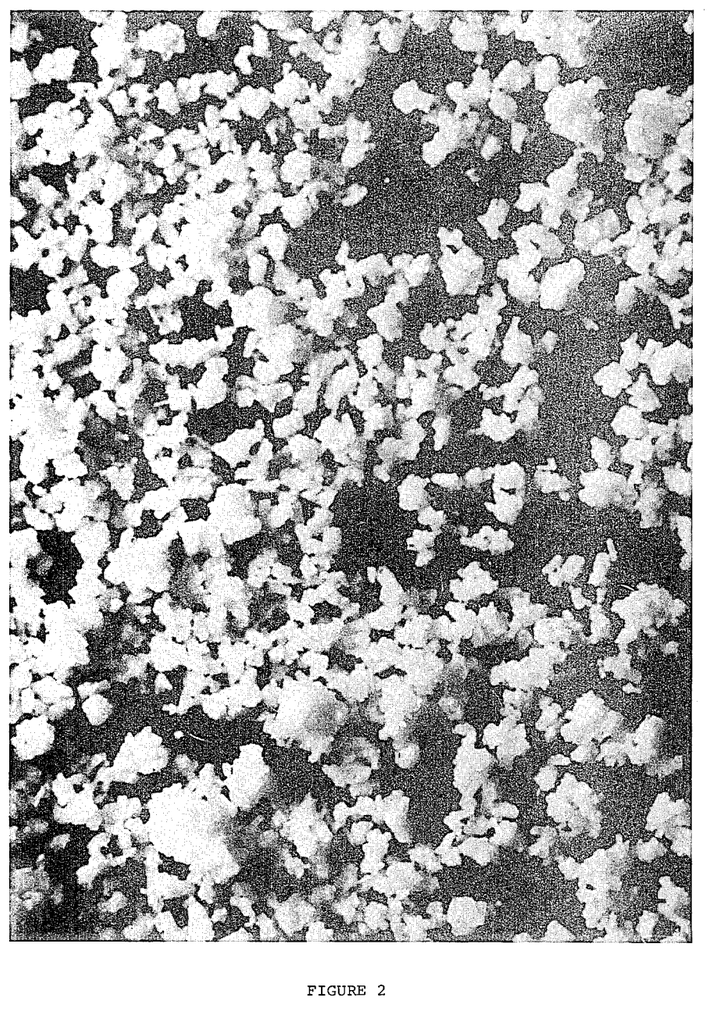
FIG. 2 is a photograph of typical crude sodium bicarbonate feed particles.

FIG. 2 (magnification 50X) illustrates typical crude sodium bicarbonate feed particles which are relatively lumpy and have a high bulk density of 650 grams per liter.

Figure 3:
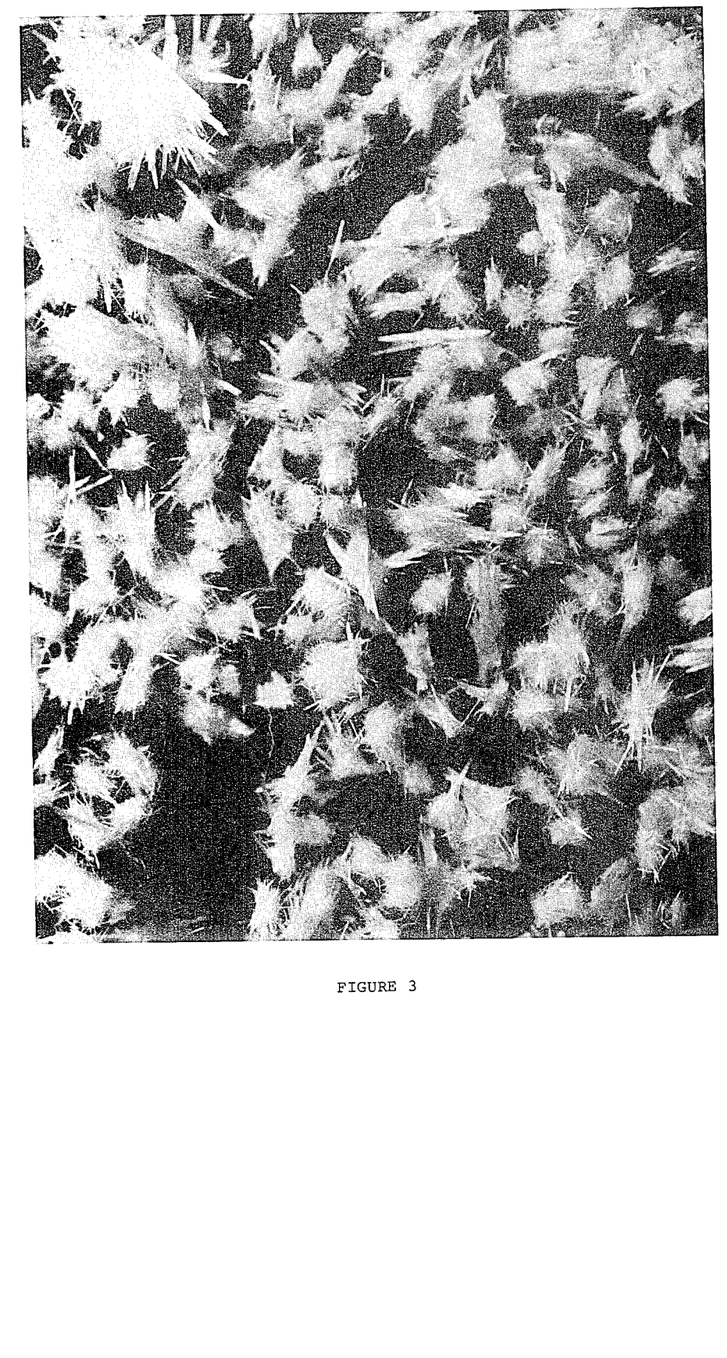
FIG. 3 is a photograph of typical product particles containing about 100% Wegscheider's Salt and having a bulk density of about 95 grams per liter.

FIG. 3 shows magnification 50X) product particles containing 100% Wegscheider's Salt in the form of randomly oriented microneedles. Chemical analysis of the particles revealed $NaHCO_3$ content of about 71.3%, $Na_2CO_3$ content of about 28.5% and $H_2O$ content of about 0.2%. The product particles had a bulk density of about 95 grams per liter. The screen analysis of the FIG. 3 product particles was as follows:

| U.S. Sieve No. | % On Screen |
| --- | --- |
| +20 | 0.9 |
| −20+40 | 7.4 |
| −40+60 | 75.2 |
| −60+80 | 11.3 |
| −80+100 | 1.9 |
| −100+140 | 0.7 |
| −140+200 | 1.5 |
| −200 | 1.1 |

Figure 4:
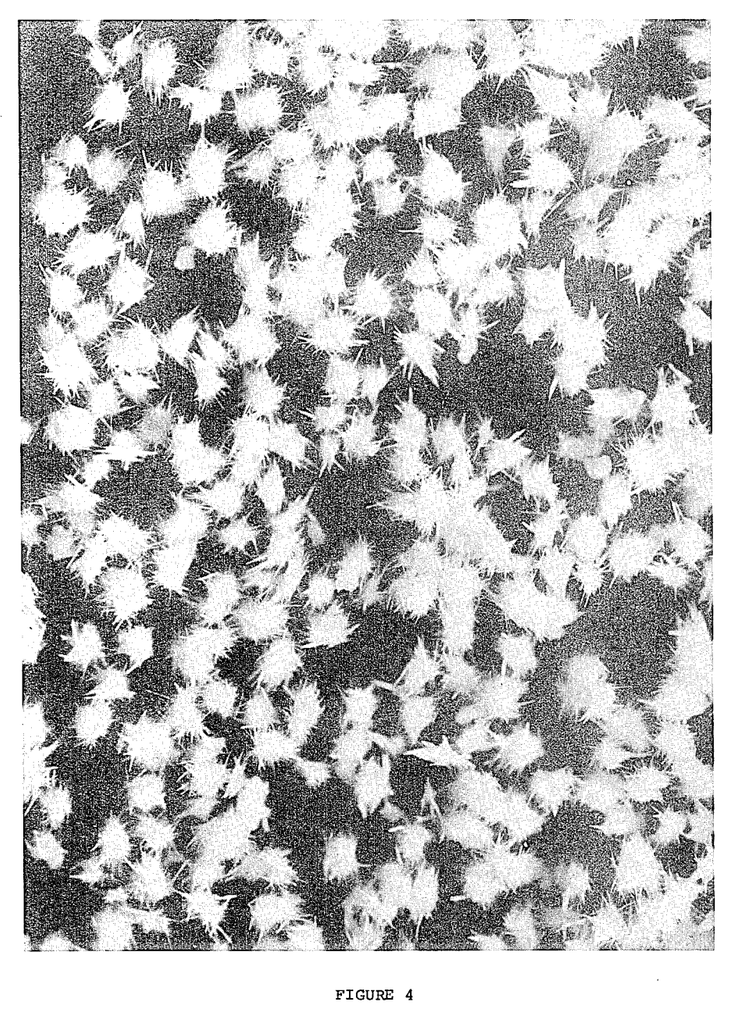
FIG. 4 is a photograph of typical product particles containing about 50% Wegscheider's Salt and about 50% sodium bicarbonate and having a bulk density of about 95 grams per liter.

FIG. 4 (magnification 50X) shows product particles containing approximately 50% Wegscheider's Salt and 50% sodium bicarbonate in the form of randomly oriented microneedles. Chemical analysis revealed that such particles had a $NaHCO_3$ content of approximately 84.8%, a $Na_2CO_3$ content of approximately 14.5% and a $H_2O$ content of approximately 0.7%. The bulk density of these particles was about 95 grams per liter. The screen analysis of the FIG. 4 product particles was as follows:

| U.S. Sieve No. | % On Screen |
| --- | --- |
| +20 | 0.8 |
| −20+40 | 6.8 |
| −40+60 | 73.5 |
| −60+80 | 10.2 |
| −80+100 | 2.5 |
| −100+140 | 2.0 |
| −140+200 | 1.9 |

| U.S. Sieve No. | % On Screen |
| --- | --- |
| \-continued | |
| −200 | 2.3 |

In general, the product particles comprise Wegscheider's Salt, sodium bicarbonate and sodium sesquicarbonate. If the reaction is carried to completion, product particles containing 100% Wegscheider's Salt will normally result. Hence, the chemical composition of the product of this invention can be varied from 10% Wegscheider's Salt to 100% Wegscheider's Salt. The normal range of product composition is illustrated more fully in the table below:

RANGE OF PRODUCT COMPOSITION

| | Wegscheider's Salt | | | |
| --- | --- | --- | --- | --- |
| Compound | 100% | 50% | 15% | Approximately 10% |
| % Sodium Bicarbonate | 71.3 | 84.8 | 86.8 | 90.0 |
| % Sodium Carbonate | 28.5 | 14.5 | 12.9 | 9.3 |
| % Water | 0.2 | 0.7 | 0.3 | 0.7 |

When crude sodium bicarbonate from the Solvay Process is used as the sodium bicarbonate component of the aqueous feed mixture, this crude sodium bicarbonate normally has about 0.8% ammonia content and an ammonia odor. After such crude bicarbonate is employed in the process of this invention, the product contains only about 0.02% ammonia and does not exhibit any substantial ammonia odor.

The product porosities are pore volumes which represent part of the spectrum of pores revealed via mercury porosimetry. In mercury porosimetry a sample is progressively pressurized with liquid mercury, and volume readings are made periodically. A particular part of the total spectrum, "useful pores", is determined by measuring total porosity of various soda materials and by measuring the tendency of such materials to bleed when impregnated with liquid non-ionic surfactants. Correlation between these two kinds of measurement may be made at volumes of pores which are two microns and smaller in size. Larger pores do not seem to have the required capillarity. The volume of all pores up to 2 microns in diameter is used to indicate useful porosity because of such correlation between such useful porosity and absorption of liquid non-ionic wetting agent. Under this system of measurement sodium bicarbonate has no measurable porosity. We have found that the porosity of the product of the present invention ranges from about 0.01 to 0.16 milliliters per gram, based on the volume of pores which are two microns and smaller. This adjusted pore volume corresponds to a total pore volume ranging from about 1.84 to 3.35 milliliters per gram. As merely illustrative, our product having such pore volume can absorb about 50% of wetting agent.

As previously stated, the bulk density for the product of this invention ranges between about 70 to about 400 grams/liter (g/l). This is to be compared to an approximate bulk density of about 600 g/l for air-dried crude sodium bicarbonate.

Friability is defined as the sum of the two entities, breakage and attrition. Friability is determined as follows: A −20 to +80 mesh portion of the sample is placed on a 100-mesh screen with 50 grams of 5 mm glass beads. A 140-mesh screen and pan are placed underneath. After vibration, the portion of the sample passing through the 100-mesh screen and standing on the 140-mesh screen is reported as "percent breakage". The portion passing through 140-mesh is called percent attrition. The friability of a typical product of the present invention ranges from about 6 to 90% for products ranging from about 100 to 10% Wegscheider's Salt, by weight, respectively.

By control of the water content of feed mixture, the amount of Wegscheider's Salt in feed mixture, the first temperature, and the second temperature in accordance with the process of this invention, products having a variety of bulk densities ranging from about 70 to 400 g/l can be prepared. Generally, the bulk density depends on the chemical composition of the product. Products having low bulk densities have a high Wegscheider's Salt content and a low free sodium bicarbonate content; on the other hand, products having high bulk densities are low in Wegscheider's Salt and high in free sodium bicarbonate. By the process of this invention a low bulk density product is obtained in a relatively short length of time and is substantially free of caking and lumping.

We have found that when moist sodium bicarbonate is heated up to 110°C. without an activation step, such a low density product is not obtained. We have also found that the activation step is not a pre-drying step because substantially no weight loss accompanies the activation. It is important in our invention that sodium carbonate values are added to the feed mixture in the form of Wegscheider's Salt and not in the form of sodium carbonate, per se.

EXAMPLE 1

PRODUCT CONTAINING ABOUT 100 PERCENT WEGSCHEIDER'S SALT

This operation was conducted in accordance with the general procedure shown in FIG. 1. 67.5 Grams of crude sodium bicarbonate (about 0.8% by weight, ammonia) having a bulk density of about 600 g/l (air dried sample) and 1.4 ml of water were added into a feed mixer so as to provide a water content of 18% based on wet sodium bicarbonate. About 22.5 grams of Wegscheider's Salt having a bulk density of about 80 g/l were mixed with the wet sodium bicarbonate in the feed mixer. The feed comprised, by weight, about 75% wet sodium bicarbonate and 25% Wegscheider's Salt. Thereafter, the mixture was passed through a 12-mesh screen to break up the lumps.

The screened mixture was then placed in a 1-liter round-bottom flask. A thermocouple was placed in contact with the reaction mixture so as to measure reaction temperature. An exit line from the rotating flask was vented to the atmosphere for release of gases generated during the reaction. During rotation, the flask containing the reaction mixture was immersed in an oil bath held at 90°C. After 25 minutes of heating at the 90°C. bath temperature (activation step), the bath temperature was raised to 110°C. at which time the temperature of the reaction mixture in the flask was about 98°C. The reaction mixture in the flask expanded and filled the flask after 25 additional minutes at the 110°C. bath temperature. The temperature of the reaction mixture at this time was about 98°C. The reaction mixture was thereafter exposed to a dry air stream flowing at a rate of 233 ml per minute to remove excess water from the product. The product was then air dried at room temperature. A portion of this product was recycled to the feed mixture so as to provide a feed mixture of approximately 75% crude (wet) sodium bicarbonate and 25% Wegscheider's Salt. The above-mentioned process for treating crude sodium bicarbonate was repeated in a second run. A portion of the product obtained from the second run of the process was also recycled to the feed mixer so as to provide a third aqueous feed mixture of approximately 75% wet sodium bicarbonate and 25% Wegscheider's Salt. The aforementioned procedure was then repeated for the third time so as to obtain a final third product comprising about 100% Wegscheider's Salt. The properties of the final (third) product (a theoretical 100% Wegscheider's Salt final product would have a chemical composition of about 70.4% sodium bicarbonate and 29.6% sodium carbonate) were as follows:

Bulk density - 95 g/l

Pore volume (2 microns and smaller) - 0.11 milliliters per gram (ml/g)

Total pore volume (mercury intrusion technique) - 2.76 ml/g.

| Chemical analysis (by weight): | |
|---|---|
| % $NaHCO_3$ | 71.3 |
| % $Na_2CO_3$ | 28.5 |
| % $H_2O$ | 0.2 |
| % Ammonia | 0.02 |

(Corresponded to about 100% Wegscheider's Salt by X-ray analysis)

| | | |
|---|---|---|
| Friability | 6% | (friability of the air-dried crude sodium bicarbonate feed was 99%) |

Screen analysis of product and feed are as follows:

| U.S. Sieve No. | % Product On Screen | % Crude Bicarbonate in Feed on Screen |
|---|---|---|
| +20 | 0.9 | 0.1 |
| −20+40 | 7.4 | 0.6 |
| −40+60 | 75.2 | 11.2 |
| −60+80 | 11.3 | 18.8 |
| −80+100 | 1.9 | 12.7 |
| −100+140 | 0.7 | 20.6 |
| −140+200 | 1.5 | 15.8 |
| −200 | 1.1 | 20.3 |

EXAMPLE 2

PRODUCT CONTAINING ABOUT 50% WEGSCHEIDER'S SALT

This operation was carried out in substantially the same apparatus and under substantially the same process conditions as Example 1 except that water was not added to the crude sodium bicarbonate, the activation heating time was about 30 minutes, and the total heating time was about 50 minutes. The properties of the final product are as follows:

| Chemical composition (by weight): | |
|---|---|
| % $NaHCO_3$ | 84.8 |
| % $Na_2CO_3$ | 14.5 |
| % $H_2O$ | 0.7 |

(corresponded to about 50% Wegscheider's Salt and 50% sodium bicarbonate by X-ray analysis)

| | |
|---|---|
| Bulk density | 100 g/l |
| Friability | 22% |

Screen Analysis:

| U.S. Sieve No. | % Product on Screen |
|---|---|
| +20 | 0.8 |
| −20+40 | 6.8 |
| −40+60 | 73.5 |
| −60+80 | 10.2 |
| −80+100 | 2.5 |
| −100+140 | 2.0 |
| −140+200 | 1.9 |
| −200 | 2.3 |

EXAMPLE 3
PRODUCT CONTAINING ABOUT 10% WEGSCHEIDER'S SALT

This operation was carried out in substantially the same apparatus as Example 1. The feed to the feed mixing unit was 100 grams of crude (wet) sodium bicarbonate (moisture content of about 15 percent) having an air-dried bulk density of about 600 g/l and 25 grams of Wegscheider's Salt having a bulk density of about 200 g/l. The mixture was screened through a 12-mesh screen. The feed mixture was then placed in the rotating oneliter rotary reactor flask surrounded by an oil bath at a temperature of about 90°C. for about 25 minutes. The temperature of the reaction mixture at the end of this 25-minute period was about 89°C. The bath was then raised to a temperature of about 110°C. The flask was removed from the bath after a time of about 10 minutes at the 110°C. temperature. The temperature of the reaction at the end of this 10-minute period was about 97°C. The product was then air-dried. The dired product (A) had a bulk density of about 200 g/l and analyzed, by weight, 86.4% NaHCO$_3$, 12.7% Na$_2$CO$_3$, and 0.9% H$_2$O. Thereafter, 40 grams of product (A) were mixed with 100 grams of crude sodium bicarbonate and screened in a 12-mesh screen. The mixture was then heated to about 90°C. for about 35 minutes in the one-liter flask surrounded by an oil bath. The temperature of the reaction mixture at the end of the 35-minute period was about 90°C. The temperature of the oil bath was then raised to about 110°C. The flask was removed from the bath after a total time of about 45 minutes. The temperature of the reaction mixture at the end of the 45-minute period was about 97°C. This product (B) was dried and had a bulk density of 295 g/l and analyzed, by weight 89.9% NaHCO$_3$, 9.6% Na$_2$CO$_3$, and 0.5% H$_2$O. Subsequently, 40 grams of product (B) were mixed with 100 grams of crude sodium bicarbonate and the above process was repeated again except that the bath temperature was set at about 90°C. for about 45 minutes (the reaction temperature was also about 90°C.) and then at 110°C. for about 11 to 12 minutes (the reaction temperature was about 97°C.). This product (C) had a bulk density of about 310 g/l and analyzed, by weight, 90.6% NaHCO$_3$, 8.8% Na$_2$CO$_3$, and 0.6% water. A final product (D) was prepared from product (C) using the identical procedure as given above to prepare product (C) from product (B). Product (D) had a bulk density of about 275 g/l and analyzed 89.3% NaHCO$_3$, 9.6% Na$_2$CO$_3$, and 1.1% H$_2$O. Products (B), (C) and (D) were mixed together to obtain a final product. The properties of this final product were as follows:

Bulk density - 330 g/l (The bulk density of final product is greater than that of the average of the sum of the products (B), (C) and (D) because of breakage of Wegscheider's Salt needle clusters during mixing.)

Chemical composition (by weight):
% NaHCO$_3$ 90.0
% Na$_2$CO$_3$ 9.3
% H$_2$O 0.75
Friability — 89.8%
Screen Analysis:

| U.S. Sieve No. | % Product on Screen |
|---|---|
| +20 | 1.0 |
| −20+40 | 4.2 |
| −40+60 | 19.4 |
| −60+80 | 37.5 |
| −80+100 | 16.4 |
| −100+140 | 11.5 |
| −140+200 | 5.4 |
| −200 | 4.6 |

EXAMPLE 4 - Comparative Example
HEATING A WET SODIUM BICARBONATE CONTAINING MIXTURE IN ONE STEP (WITHOUT AN ACTIVATION STEP)

This operation was carried out in substantially the same apparatus as described in Example 1. A feed mixture of approximately 75% crude sodium bicarbonate (dry bulk density of about 600 g/l and 25% Wegscheider's Salt (bulk density of about 200 g/l), by weight, was prepared. The mixture was then passed through a 12-mesh screen to break up the lumps. The screened mixture was placed in a liter flask and thereafter heated directly to 110°C. for about 40 minutes. The product exhibited substantial caking and lumping. The product was screened, and the lumps were discarded. The product had the following properties:

Bulk density - 265 g/l (corresponded to about 90% Wegscheider's Salt by X-ray analysis)

Various modifications and alterations will become apparent to those skilled in the art without departing from the scope and spirit of the invention, and it should be understood that the latter is not necessarily limited to the aforementioned discussion.

We claim:
1. A process for preparing a low bulk density and substantially lump-free product from sodium bicarbonate, which comprises the steps of:
   a. passing to a reaction zone a feed mixture comprising, by weight, (1) at least about 50% said sodium bicarbonate, (2) about 3 to 25% Wegscheider's Salt, and (3) about 5 to 20% water;
   b. heating said mixture in the absence of added carbon dioxide to a first temperature ranging between a temperature below which sodium bicarbonate is unable to be converted into nuclei of Wegscheider's Salt and a temperature above which substantial thermal decomposition of sodium bicarbonate and substantial formation of sodium sesquicarbonate occurs, for a first time sufficient to form Wegscheider's Salt nuclei and to avoid substantial caking and bulk density increase of the mixture;
   c. thereafter subjecting said heated mixture in the absence of added carbon dioxide at a second tem- perature ranging between a temperature at least about 10°C. higher than said first temperature and a temperature less than the decomposition temperature of Wegscheider's Salt for a second time sufficient to prepare product particles containing at least 10% by weight Wegscheider's Salt in needlelike form; and d. recovering the product particles having a lower bulk density and a greater absorption property than said aqueous feed mixture.

2. The process of claim 1 wherein said aqueous feed mixture comprises, by weight, about 50 to 80 percent sodium bicarbonate, about 3 to 25 percent Wegscheider's Salt and about 5 to 20 percent water.

3. The process of claim 1 wherein said aqueous feed mixture comprises, by weight, about 70 to 80 percent sodium bicarbonate, about 15 to 25 percent Wegscheider's Salt and about 12 to 18 percent water.

4. The process of claim 1 wherein the Wegscheider's Salt component of said aqueous feed mixture is obtained by recycling a portion of said product particles removed from said reaction zone.

5. The process of claim 1 wherein said first temperature ranges from about 85° to 95°C. as adjusted to one atmosphere.

6. The process of claim 1 wherein said first temperature ranges from about 88° to 92°C.

7. The process of claim 1 wherein said first time ranges from about 20 to 50 minutes.

8. The process of claim 1 wherein said first time ranges from about 20 to 30 minutes and said product particles contain from about 50 to 100 percent Wegscheider's Salt.

9. The process of claim 1 wherein said second temperature ranges from about 100°C. to less than 125°C. as adjusted to one atmosphere.

10. The process of claim 1 wherein said second temperature ranges from about 100° to 115°C. as adjusted to one atmosphere.

11. The process of claim 1 wherein said second time ranges from about 15 to 50 minutes.

12. A product formed from sodium bicarbonate comprising at least 10 percent weight of randomly oriented Wegscheider's Salt particles in needlelike form, sodium sesquicarbonate, sodium bicarbonate and water, said product having a bulk density ranging from about 70 to about 400 grams per liter (about 4 to about 25 pounds per cubic foot), a water content of less than about 1 percent by weight and a pore volume of from about 0.10 to 0.16 milliliters per gram (pores of 2 micron size and smaller).

13. The product of claim 12 wherein the product particles comprise in excess of 50 percent by weight of Wegscheider's Salt.

14. The product of claim 12 wherein the product particles consist essentially of Wegscheider's Salt.

* * * * *